United States Patent
Yogesha et al.

(10) Patent No.: US 8,340,839 B2
(45) Date of Patent: Dec. 25, 2012

(54) AIRCRAFT COMMUNICATIONS RADIO TUNING AID SYSTEM AND METHOD

(75) Inventors: Aralakuppe Ramegowda Yogesha, Karnataka (IN); Harsh Badli, Karnataka (IN); Jayaraj Pandian, Karnataka (IN); Manu Ramachandraswamy, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 348 days.

(21) Appl. No.: 12/728,794

(22) Filed: Mar. 22, 2010

(65) Prior Publication Data
US 2011/0231036 A1    Sep. 22, 2011

(51) Int. Cl.
G01C 23/00    (2006.01)
(52) U.S. Cl. .......................................................... 701/3
(58) Field of Classification Search .................. 701/3
See application file for complete search history.

(56) References Cited

U.S. PATENT DOCUMENTS

| | | | |
|---|---|---|---|
| 4,104,512 A | 8/1978 | Strayer |
| 5,212,804 A | 5/1993 | Choate |
| 5,798,726 A | 8/1998 | Schuchman et al. |
| 6,282,417 B1 | 8/2001 | Ward |
| 6,708,090 B2 | 3/2004 | Staggs |
| 6,714,783 B1 | 3/2004 | Simonin et al. |
| 6,812,858 B2 | 11/2004 | Griffin, III |
| 6,828,921 B2 | 12/2004 | Brown et al. |
| 7,356,389 B2 | 4/2008 | Holst et al. |
| 7,359,703 B2 | 4/2008 | McGuffin et al. |
| 7,375,771 B2 | 5/2008 | Naoi et al. |
| 2006/0229104 A1 | 10/2006 | de La Chapelle et al. |
| 2007/0129855 A1 | 6/2007 | Coulmeau |
| 2007/0213925 A1 | 9/2007 | Sharma et al. |
| 2007/0288128 A1 | 12/2007 | Komer et al. |
| 2008/0120020 A1 | 5/2008 | Bay et al. |
| 2009/0005034 A1 | 1/2009 | de la Tousche et al. |
| 2009/0130982 A1 | 5/2009 | Coulmeau et al. |
| 2009/0318138 A1 | 12/2009 | Zeng et al. |

FOREIGN PATENT DOCUMENTS

| | | |
|---|---|---|
| WO | 03021977 A2 | 3/2003 |
| WO | 03021977 A3 | 3/2003 |

OTHER PUBLICATIONS

EP Communication Pursuant to Article 94(3) EPC, EP 11155516.5-2215 dated Jun. 1, 2011.
EP Communication, EP 11155516.5-2215 dated Oct. 18, 2011.
EP Search Report, EP 11155516.5-2215 dated May 25, 2011.

*Primary Examiner* — Eric Culbreth
(74) *Attorney, Agent, or Firm* — Ingrassia Fisher & Lorenz, P.C.

(57) ABSTRACT

Methods and apparatus are provided of displaying air traffic control communication information in an aircraft having an aircraft communications radio. Each air traffic control (ATC) communication station that is within a predetermined distance of an aircraft position is identified. Indicia representative of the identified ATC communication stations that are determined to be within the range of the aircraft communications radio are rendered on a display device.

18 Claims, 5 Drawing Sheets

AIRCRAFT COMMUNICATIONS RADIO TUNING AID SYSTEM AND METHOD

TECHNICAL FIELD

The present invention generally relates to aircraft communication, and more particularly relates to a system and method that aids in tuning aircraft communications radios to air traffic control communication stations.

BACKGROUND

The airspace through which aircraft travel is divided into three-dimensional regional zones or sectors known as air traffic control (ATC) sectors. The boundaries of each ATC sector are defined laterally by latitudinal and longitudinal coordinates, and vertically by specifically designated lower and upper altitude limits. The boundaries between ATC sectors may be horizontal, vertical, or both. In addition to the boundaries, each ATC sector is typically assigned a set of permanent communication frequencies in both the very-high frequency (VHF) range and the ultra-high frequency (UHF) range. Air traffic controllers (or just "controllers") use these frequencies to maintain voice contact with aircraft crews. In this manner, air traffic controllers maintain control over the aircraft with respect to ATC directions and clearances.

To ensure adequate separation between aircraft, controllers should be aware of all aircraft that are in their ATC sector and know when aircraft enter or leave their ATC sector. Aircraft may enter an ATC sector only with the permission of the controller that controls that ATC sector. Before an aircraft passes from one ATC sector to the next, a controller in the current ATC sector will typically direct the pilot to change the frequency of the aircraft communications radio from the current sector frequency to the frequency of the next ATC sector. The pilot then manually tunes the aircraft communications radio to that frequency, and initiates the voice communication with the controller in the next ATC sector. Although the present system and method is generally safe and reliable, as will now be described, it does suffer certain drawbacks.

The above-described ATC sector frequency changing activities are performed by the pilot each time the aircraft travels between ATC sectors, potentially distracting the pilot. Additionally, pilots presently do not have an automated means of knowing where the ATC sector boundaries are located; thus the notice to change ATC sector frequencies can seemingly be unexpected and random in nature. For jet aircraft, these ATC sector frequency changes can take place, on average, up to nine times per flight hour.

Moreover, ATC sector coverage depends on the type of equipment installed at the ATC station. For example, a simple ATC sector at an airfield may extend in a 10 mile radius around the airfield, and to a height of 10,000 feet above the airfield. Other ATC stations equipped with long range radar have the capability, at higher altitudes, to see aircraft within 200 nautical miles of the radar antenna. Of course, the communication range of an aircraft is limited by the capacity of its communications radio. For example, the range of typical Class 3 and 5 communications radios is up to about 200 nautical miles, whereas the range of typical Class 4 and 6 communications radios is only up to about 100 nautical miles. It may thus be readily understood that the two-way communication between a controller and a pilot is limited to the minimum of the respective communication equipment ranges. This may place an additional constraint upon determining when an aircraft will pass outside the range of the current ATC sector, which may be well before the actual boundary of the ATC sector. In some instances, a pilot may not realize when the aircraft is approaching the range of the aircraft communications radio and may not initiate an appropriate ATC sector frequency change in a timely manner.

Furthermore, not all stations in an ATC sector operate 24 hours a day and/or throughout the year. The daily working hours may vary based on the aircraft traffic and the available personnel. For example, stations in some ATC sectors may operate from 06:00 to 22:00. Prior to filing a flight plan, a pilot is expected to know the operational hours and/or days of the ATC stations with which the pilot may communicate. If not, the pilot may end up flying the aircraft into a non-operational ATC sector or an uncontrolled sector, where the pilot cannot communicate with an ATC communication station.

Methods are therefore needed in order to overcome these and other limitations of the prior art. What is needed is an improved, efficient, and intuitive method for ATC switchover operation. Methods are needed to improve a pilot's situational awareness with respect to available ATC stations. Additionally methods are needed to help a pilot in planning the flight path with respect to available and unavailable ATC sectors Further, methods are needed to suggest modifications to planned routes in flight plans to achieve maximum ATC coverage during the flight.

BRIEF SUMMARY

In one embodiment, a method of displaying air traffic control communication information in an aircraft having an aircraft communications radio includes processing data to determine one or more aircraft positions, processing data to identify each air traffic control (ATC) communication station that is within a predetermined distance of the one or more aircraft positions, processing data to determine which of the identified ATC communication stations are, or will be, within range of the aircraft communications radio, and rendering, on a display device, indicia representative of the identified ATC communication stations determined to be within the range of the aircraft communications radio.

In another embodiment, a method of displaying air traffic control communication information in an aircraft having an aircraft communications radio includes processing flight plan data to determine a current flight plan of the aircraft, processing data to identify air traffic control (ATC) communication stations within a predetermined distance of the current flight plan, and rendering, on a display device, indicia representative of at least a portion of the identified ATC communication stations. Data are processed to determine which of the identified ATC communication stations are active ATC communication stations and which are inactive ATC communication stations. The aircraft communications radio is tuned to one of the active ATC communication stations. A switchover distance is determined The switchover distance is a distance from a first aircraft position to an aircraft position at which a next one of the identified ATC communication stations on the current flight plan will become an active ATC communication station. At least the switchover distance ring is rendered on a display device.

In yet another embodiment, a method of displaying air traffic control communication information in an aircraft having an aircraft communications radio includes processing flight plan data to determine a current flight plan of the aircraft, processing data to identify air traffic control (ATC) communication stations that will be within a predetermined distance of each of the plurality of legs of the flight plan, and processing data to determine which of the identified ATC communication stations are active ATC communication stations and which are inactive ATC communication stations. A determination is made as to whether the current flight plan includes one or more uncontrolled airspace sections. An uncontrolled airspace section is at least a portion of one of more of the plurality of legs of the current flight plan that, when flown as projected to be flown by the aircraft, will include no active ATC communication stations. Those portions of the current flight plan that are not uncontrolled sections are rendered on the display device in accordance with a first display paradigm, and the one or more uncontrolled airspace sections are rendered on the display device in accordance with a second display paradigm.

Furthermore, other desirable features and characteristics of the system and method described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
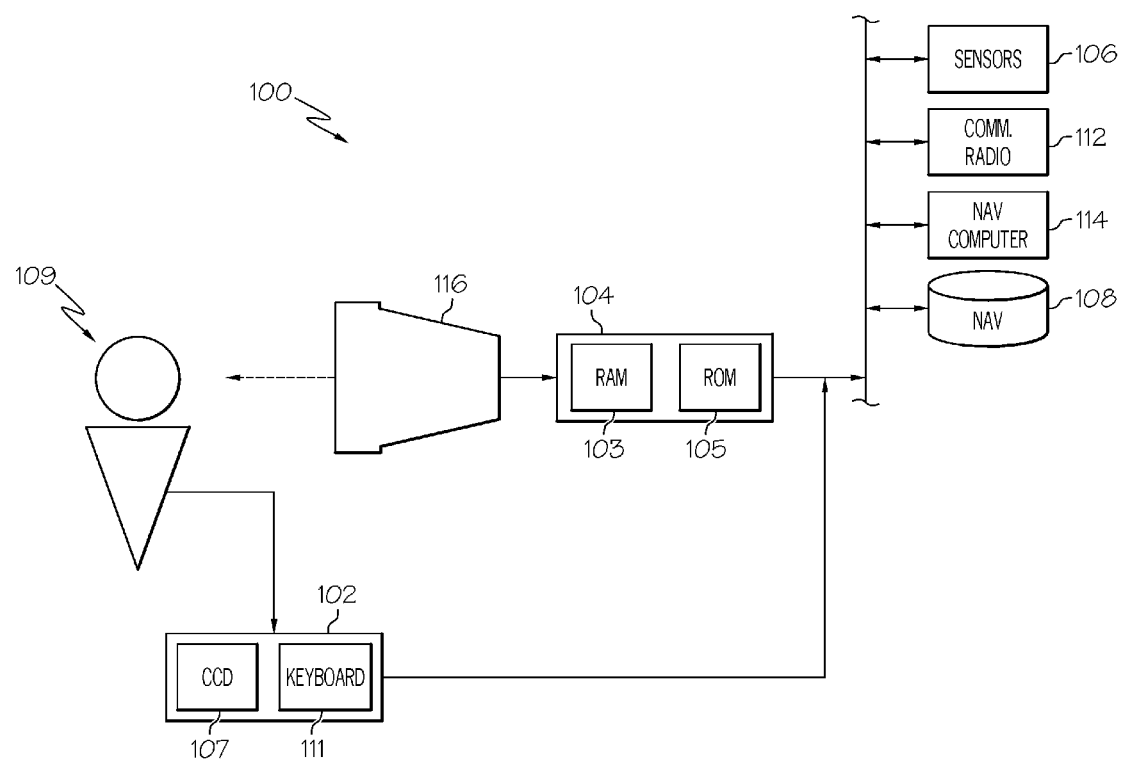
FIG. 1 depicts a functional block diagram of an example embodiment of a flight deck display system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, an exemplary flight deck display system 100 will be described. In the depicted embodiment, the system 100 includes at least a user interface 102, one or more processors 104, various sensors 106, one or more navigation databases 108, an aircraft communications radio 112, a navigation computer 114, and a display device 116. Before proceeding further, it will be appreciated that the depicted system 100 is merely exemplary, and that it could be implemented without one or more of the depicted components, systems, and data sources. It will additionally be appreciated that the system 100 could be implemented with one or more additional components, systems, or data sources, or receive inputs therefrom.

Continuing now with the description of the system 100, the user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol that is rendered on the display device 116, and may use the keyboard 111 to, among other things, input textual data.

The processor 104 is in operable communication with the navigation databases 108, the aircraft communications radio 112, the navigation computer 114, and the display device 116, and is coupled to receive various types of aircraft data from the various sensors 106, and various other avionics-related data from one or more other non-illustrated external systems. The aircraft data that are supplied from the sensors 106 include various types of air data such as, for example, aircraft speed, altitude, and heading, and various types of inertial data such as, for example, aircraft location and attitude. The processor 104 is configured to selectively retrieve, upon receipt of these data, data from one or more of the navigation databases 108, and to supply appropriate display commands to the display device 116 so that various images, which are discussed in more detail further below, are appropriately rendered on the display device 116.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, and aircraft approach information. The navigation-related data, at least in the depicted embodiment, additionally includes air traffic control (ATC) communication station locations and associated communication frequencies, operational days and hours, and various other types of ATC communication station information. It will be appreciated that, although the navigation databases 108 are, for clarity and convenience, shown as being stored separate from the processor 104, all or portions of the navigation databases 108 could be loaded into the on-board RAM 103, or integrally formed as part of the processor 104, and/or RAM 103, and/or ROM 105. The navigation databases 108 could also be part of a device or system that is physically separate from the display system 100. It will additionally be appreciated that the navigation databases 108 (as well as other data sources) may, in some embodiments, be updated periodically, in response to a NOTAM (notice to airmen) or datalink message, or in response to user input.

The aircraft communications radio 112 is configured to at least allow voice communication between the user 109 and various ATC communication stations (not illustrated). The aircraft communications radio 112 may be tuned manually or, in some embodiments that will be described further below, automatically in response to an input from the user interface 102. It will be appreciated that the aircraft communications radio 112 may be implemented using any one of numerous known communications radio configurations now known or developed in the future.

The navigation computer 114 is used, among other things, to allow the user 109 to program a flight plan from one location to another. The navigation computer 114 may be in operable communication with a non-illustrated flight director, which may be used to automatically fly, or assist the user 109 in flying, the programmed route. The navigation computer 114 is in operable communication with various databases and data sources including, for example, the navigation databases 108. The processor 104 may receive the programmed flight plan data from the navigation computer 114 and command the programmed flight plan, or at least portions thereof, to be rendered on the display device 116 along with various other data.

The display device 116 is used to display various images and data, in a graphic, iconic, and a textual format, and to supply visual feedback to the user 109 in response to user input commands supplied by the user 109 to the user interface 102. It will be appreciated that the display device 116 may each be implemented using any one of numerous known displays suitable for rendering image and/or textual data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display device, a heads-up display (HUD) projection, or any known technology. In an exemplary embodiment, display device 116 includes a panel display. It will be appreciated that the system 100 could be implemented with more than one display device 116.

Figure 2:
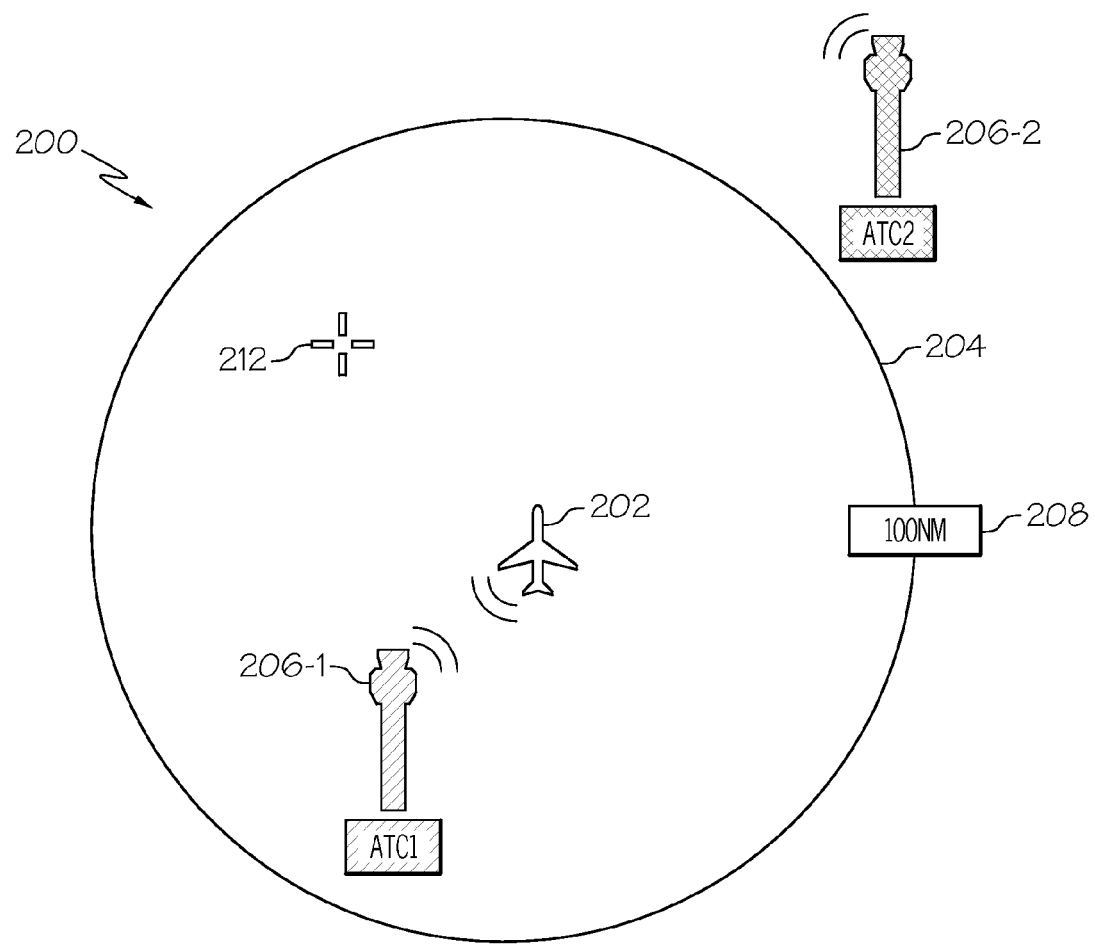
FIGS. 2-5 depict exemplary images that may be rendered on a display device of the system of FIG. 1.

With reference now to FIG. 2, an example image 200 that includes exemplary textual, graphical, and/or iconic information rendered by the display device 116, in response to appropriate image rendering display commands from the processor 104, is depicted. In the depicted embodiment the display device 116 renders an image of a two-dimensional lateral situation view. It is noted, however, that the rendered image 200 is merely exemplary, and is provided herein for clarity and ease of illustration and description. Indeed, the image 200 could be rendered as a vertical situation view, or as a perspective, three-dimensional view, just to name a few non-limiting alternatives. It is additionally noted that various other images that are not depicted in FIG. 2 (or further described) could be rendered on the display device 116, if needed or desired.

The rendered image 200 includes an aircraft icon 202, a communications radio range ring 204, and two ATC communication station icons 206—a first ATC communication station icon 206-1 and a second ATC communication station icon 206-2. The aircraft icon 202 is rendered as a top-down view of the aircraft and is disposed in the center of the communications radio range ring 204. The communications radio range ring 204 is representative of the range of aircraft communications radio 112. Preferably, a range ring indicator 208 is also rendered over a portion of the communications radio range ring 204, which numerically and/or textually displays the range of aircraft communications radio 112. In the depicted embodiment, the aircraft communications radio 112 has a range of 100 NM (nautical miles). As such, the communications radio range ring 204 is scaled so that its radius corresponds to 100 NM, and the range ring indicator 208 is rendered with this value. It will be appreciated that the aircraft communications radio range is a predetermined value that is preferably stored in a non-illustrated memory in the system 100. In some embodiments, the processor 104 may command the display device 116 to render a user interface that may be used by a user 109 to enter a desired range value. The range value entered by the user 109 is used to scale the communications radio range ring 204, and is rendered thereon as the range ring indicator 208. It will additionally be appreciated that the communications radio range ring 204, when rendered, represents a continuously moving envelope around the aircraft icon 202.

The processor 104, based on the current location of the aircraft or a planned future location of the aircraft, identifies each ATC communication station that is within a predetermined distance of the current (or planned) aircraft position. It will be appreciated that the predetermined distance may be a predetermined, stored value, a value that varies automatically, or a value that is input by the user. In any case, the processor 104 preferably accesses the navigation database 108, identifies and retrieves data associated with each ATC communication that is within the predetermined distance of the current (or planned) aircraft position. The processor 104 then processes these data to determine which of the identified ATC communication stations are active ATC communication stations, and which are inactive ATC communication stations. The ATC communication stations that are determined to be active are rendered in accordance with a first display paradigm, and those that are determined to be inactive are rendered in accordance with a second display paradigm.

As used herein, an active ATC communication station is one that is within the range of the aircraft communications radio 112, and with which the aircraft communications radio 112 may actively communicate. Conversely, an inactive ATC communication station is one with which the aircraft communications radio 112 may not communicate. It may thus be understood that all ATC communication stations that are outside the range of the aircraft communications radio 112 are inactive ATC communication stations. Moreover, those ATC communication stations within the range of the aircraft communications radio 112 that are, for any reason, non-operational or otherwise not available for communication with the aircraft, are also inactive communication stations. As noted above, ATC communication station location, communication frequency, operational schedules, and various other related data are stored in the navigation databases 108. It is additionally noted that in some instances, as may be appreciated, an ATC communication station may be operating and within the range of the aircraft communications radio, but communication therewith may be hindered (or not possible) due to terrain or other environmental factors. Such ATC communication stations would also be classified as inactive ATC communication stations.

With the above background in mind, it is noted that the first and second ATC communication station icons 206-1 and 206-2 are representative of first and second ATC communication stations (ATC1 and ATC2), respectively. The first ATC communication station icon 206-1 is rendered inside of the communications radio range ring 204, and the second ATC communication station icon 206-2 is rendered outside of the communications radio range ring 204. This indicates that the first ATC communication station (ATC1) is within the range of the aircraft communications radio 112, whereas the second ATC communication station (ATC2) is not within the range of the range of the aircraft communications radio 112.

In a particular preferred embodiment, the icons (or portions thereof) representative of active ATC communication stations are rendered in accordance with a first display paradigm, and the icons (or portions thereof) representative of inactive ATC communication stations are rendered in accordance with a second display paradigm that is distinguishable from the first display paradigm. Thus, as FIG. 2 additionally depicts, the first ATC communication station icon 206-1 is rendered in accordance with the first display paradigm, whereas the second ATC communication station icon 206-2 is rendered in accordance with a second display paradigm. It will be appreciated that the first and second display paradigms may be based on any one of numerous distinguishable display characteristics. For example, the first and second display paradigms may be distinguishable based on color, the thickness of the lines that are used to render the icons, the type of lines (e.g., solid, dotted, dashed, etc.) that are used to render the icons, the shape of the icons, or any one of numerous other distinguishable characteristics. In a particular preferred embodiment, the first and second display paradigms are distinguishable based on color, with active ATC communication station icons 206 being rendered in a first color, such as green, and inactive ATC communication station icons 206 being rendered in a second color, such as amber. It will additionally be appreciated that, in some instances, inactive ATC communication stations could be within the range of the aircraft communications radio 112. In such instances, icons representative of these inactive ATC communication stations would preferably be rendered within the communications radio range ring 204. Moreover, more than one active ATC communication station could be within range of the aircraft communications radio 112. In these latter instances, icons representative of the active ATC communication station to which the aircraft communications radio 112 is tuned is preferably rendered in accordance with a different display paradigm than the other active ATC communication station(s).

The processor 104, as noted above, additionally commands the display device to render a cursor symbol 212. The cursor symbol 212 is movable via the above-described CCD 107. In some embodiments the cursor symbol 212 and CCD 107 may be used to highlight and select an active ATC communication station icon 206. When an active ATC communication station icon 206 is selected using the cursor symbol 212 and CCD 107, the processor 104 automatically tunes the aircraft communications radio 112 to the frequency of the active ATC communication station represented by the selected icon 206.

In addition to displaying ATC communication station icons 206, the processor 104 may be configured, at least in some embodiments, to command the display device 116 to render data associated with the ATC communication stations. For example, text indicating the operating frequency, range, and operating hours could be rendered below the appropriate ATC communication station icons 206.

Figure 3:
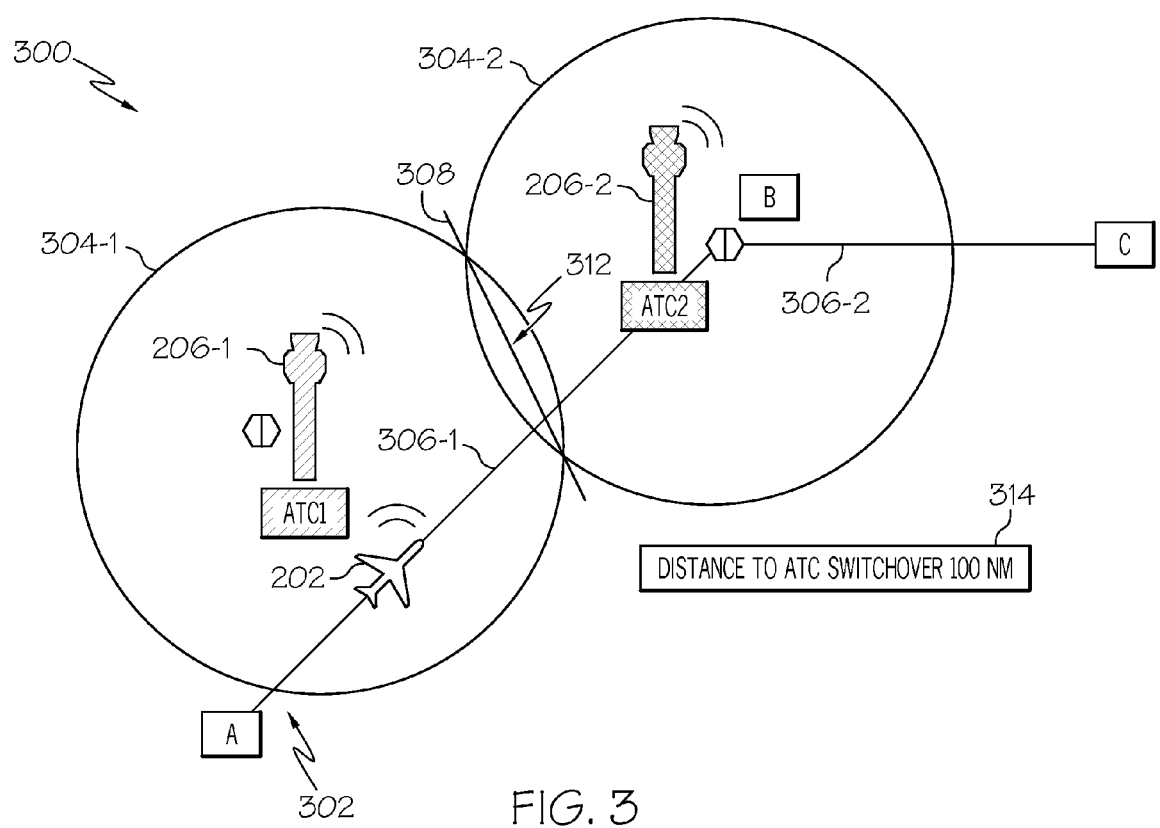

In some embodiments, the system 100 may additionally or alternatively be used to display a "switchover distance." As used herein, switchover distance is the distance from the current aircraft position to the position at which another one of the identified ATC communication stations (ATC1, ATC2, . . . , ATCN) on the current flight plan will become an active ATC communication station. An example of this additional functionality is illustrated in FIG. 3, which depicts another example of an image 300 that may be rendered on the display device 116. The rendered image 300 includes the above-described aircraft icon 202 and first and second ATC communication station icons 206-1 and 206-2. The rendered image additionally includes the current aircraft flight plan 302 and two ATC sectors 304—a first ATC sector 304-1 and a second ATC sector 304-2.

The current flight plan 302, or at least that portion of the current flight plan 302 that is being rendered on display device 116, includes a plurality of waypoints (A, B, C) that are connected by a plurality of flight plan legs 306, namely a first leg 306-1 and a second leg 306-2. The aircraft is currently flying the first leg 306-1 between waypoint A and waypoint B. The image 300 further indicates that the aircraft is currently within the first ATC sector 304-1 and is in communication with the first ATC communication station (ATC1) as represented by the first ATC communication icon 206-1.

As FIG. 3 further depicts, the first and second ATC sectors 304-1 and 304-2 partially overlap. At some point, while flying the first leg 306-1 of the current flight plan 302, the aircraft will enter the second ATC sector 304-2, and the user 109 will need to tune the aircraft communications radio 112 to the second ATC communication station (ATC2). Preferably, this switchover in communications to the second ATC communication station (ATC2) will occur at a switchover position, which is a position that at least approximately corresponds to line 308. It will be appreciated, however, that the communication switchover could occur when the aircraft is anywhere within the overlapping region 312 and within communication range of the second ATC communication station (ATC2). Nonetheless, in the depicted embodiment, the processor 104, using aircraft inertial data, flight plan data, current aircraft position, and navigation data, determines the preferred switchover distance, and commands the display device 116 to render the switchover distance 314. Although the switchover distance may be variously rendered on the display device 116, in the depicted embodiment it is rendered using text enclosed in a rectangular box. In the example depicted in FIG. 3, the aircraft will continue flying 100 NM on the first leg 306-1 of the current flight plan 302 before the switchover to the second ATC communication station (ATC2). It will be appreciated that the system 100 may be configured such that the switchover occurs either manually or automatically.

It should be noted that the boundaries of the first and second ATC sectors 304-1 and 304-2 depicted in FIG. 3 are based on the ranges of the respective ATC communication stations (ATC1 and ATC2). It will be appreciated, however, that the above functionality may also be implemented based on the range of the aircraft communications radio 112. Moreover, in some embodiments the time to the switchover position could be determined and rendered with, or instead of, the switchover distance 314. It will additionally be appreciated that the above-functionality could be implemented for an entire flight plan, not just for a portion of the flight plan, such as in the example depicted in FIG. 3. In this regard, the switchover distances (or times) could be determined and rendered, if needed or desired, for an entire flight plan, both before or during flight.

Figure 4:
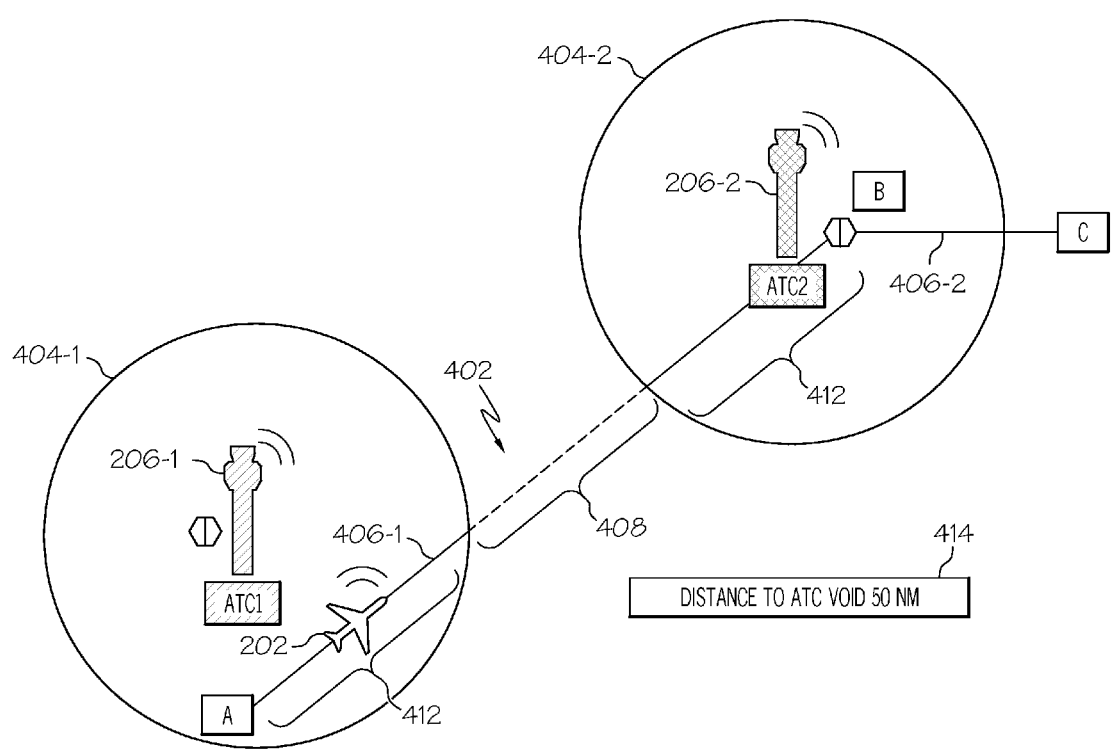

There may be instances in which an aircraft flight plan may include one or more "uncontrolled airspace sections." As used herein, an uncontrolled airspace section is a portion of a flight plan leg of the current flight plan that, when flown by the aircraft, includes no ATC communication stations or at least no active ATC communication stations. It may thus be appreciated that flight plan legs (or those portions of flight plan legs) that, when flown by the aircraft, do not include uncontrolled airspace sections may be referred to herein as "controlled airspace sections." For example, FIG. 4 depicts a current flight plan 402, which is similar to the one depicted in FIG. 3. In particular, the depicted flight plan 402, or at least that portion of the flight plan 402 that is being rendered on display device 116, includes a plurality of waypoints (A, B, C) that are connected by a first leg 406-1 and a second leg 406-2. The aircraft, as indicated by the aircraft icon 202, is currently flying the first leg 406-1 between waypoint A and waypoint B. The image 400 further indicates that the aircraft is currently within the first ATC sector 404-1 and is in communication with the first ATC communication station (ATC1), as represented by the first ATC communication icon 206-1.

The depicted first and second ATC sectors 404-1 and 404-2 do not overlap and the airspace in between these two sectors includes no ATC communication stations (or at least no ATC communication stations that will be active). Thus, a section of the flight plan 402, namely a section of the first leg 406-1 between the first and second ATC sectors 402-1 and 402-2, includes an uncontrolled airspace section 408. To alert the user to this fact, the uncontrolled airspace section 408 is rendered in accordance with a display paradigm that is different from the controlled airspace sections 412 of the first leg 406-1. That is, the controlled airspace sections 412 are rendered in accordance with a first display paradigm and the uncontrolled airspace section 408 is rendered in accordance with a second display paradigm. It will be appreciated that the first and second display paradigms may be based on any one of numerous distinguishable display characteristics. For example, the first and second display paradigms may be distinguishable based on color, the thickness of the lines that are used to render the flight plan, the type of lines (e.g., solid, dotted, dashed, etc.) that are used to render the flight plan, or any one of numerous other distinguishable characteristics. In a particular preferred embodiment, as FIG. 4 depicts, the first and second display paradigms are distinguishable based on color and line type, with controlled airspace sections 412 being rendered in a first color using solid lines, and uncontrolled airspace sections 408 being rendered in a second color using dashed lines.

In addition to rendering controlled and uncontrolled airspace sections in accordance with different paradigms, the processor 104 may also be configured to command the display device 116 to render the current distance 414 to the next uncontrolled airspace section 408. Although this distance may be variously rendered on the display device 116, in the depicted embodiment it is rendered using text enclosed in a rectangular box. In the example depicted in FIG. 4, it is seen that the uncontrolled airspace section 408 is 50 NM from the current aircraft position.

It will be appreciated that the flight plan 402 may be evaluated for uncontrolled airspace sections 408 while the aircraft is on the ground, using estimated times of arrival or estimated times to reach particular waypoints on the flight plan entered into the navigation computer 114. Moreover, although this functionality was described as being implemented based on the boundaries of ATC sectors, it will be appreciated that this functionality may also be implemented based on the range of the aircraft communications radio 112. It will additionally be appreciated that this functionality could be implemented and displayed for an entire flight plan, not just for a portion of the flight plan, such as in the example depicted in FIG. 4. In this regard, potential switchover distances (or times) could be determined and rendered, if needed or desired, for an entire flight plan, both before or during flight.

The functionality depicted in FIG. 4 and described above allows the user 109 to readily see if there are any ATC coverage voids in the current flight plan 402. This allows the user 109 to manually modify the current flight plan, if desired, to remove any ATC coverage voids. Alternatively, the system 100 may be configured to detect ATC coverage voids in a user-entered flight plan and to automatically generate one or more alternate flight plans to correct the detected ATC coverage voids. This additional functionality will now be described with reference to FIG. 5.

Figure 5:
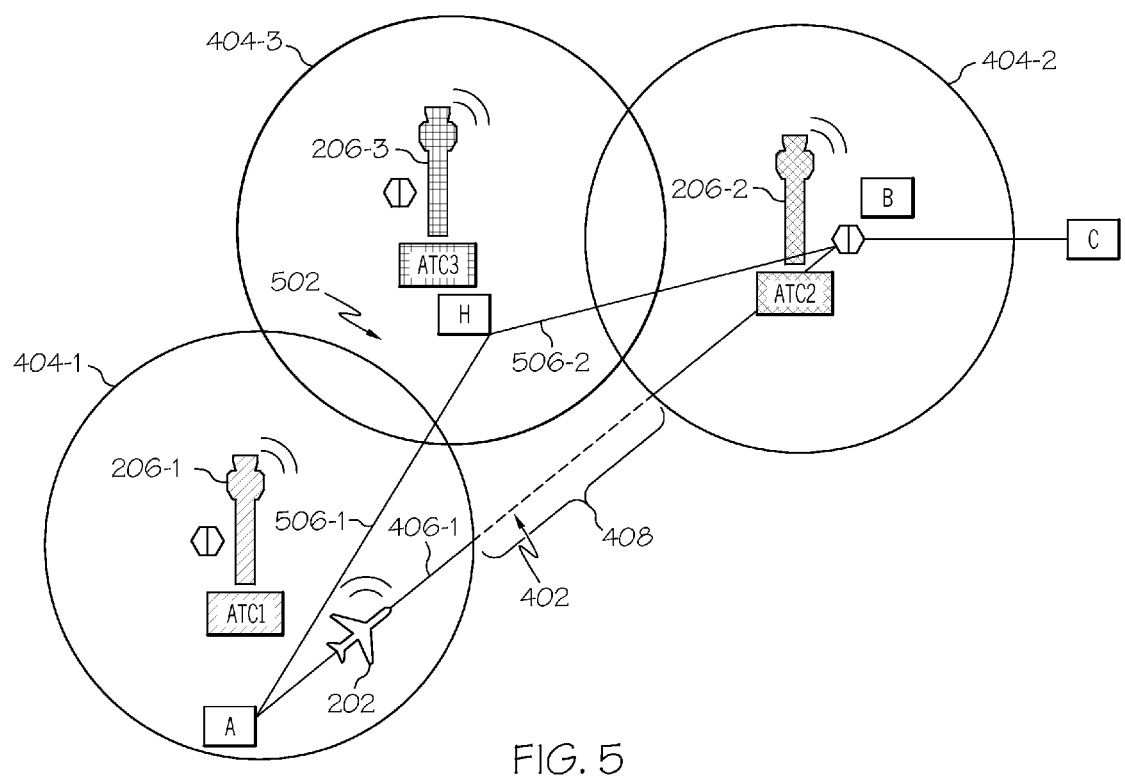

The rendered image 500 depicted in FIG. 5 includes the aircraft icon 202, first and second ATC communication station icons 206-1 and 206-2, and the user-entered flight plan 402 that was depicted in FIG. 4. As was already noted, the first leg 406-1 of the user-entered flight plan 402 includes an uncontrolled airspace section 408 due to the ATC coverage void between first and second ATC sectors 404-1 and 404-2. To provide a potential correction to eliminate this ATC coverage void, the processor 104 generated and displayed an alternate flight plan 502. The alternate flight plan 502 includes an additional way point H, and hence additional legs 506-1 and 506-2. The additional waypoint H is within the range of a third ATC communication station (ATC3), which is represented by the third ATC communication station icon 206-3. As a result, the alternate flight plan 502 includes no ATC coverage voids.

It will be appreciated that in addition to generating and displaying the alternate flight plan 502, the system 100 may be configured to generated and display various other flight planning information. The specific number and type of this additional flight planning information may vary. Some non-limiting examples include the additional distance, time, and fuel associated with the alternate flight plan. The system 100 may also be configured such that the user 109 may either select or reject the alternate flight plan. As with previously described embodiments, although this functionality was described as being implemented based on the boundaries of ATC sectors, it will be appreciated that this functionality may also be implemented based on the range of the aircraft communications radio 112. Moreover, the functionality could be implemented for an entire flight plan, not just for a portion of the flight plan, such as in the example depicted in FIG. 5. In this regard, potential flight modifications could be determined and rendered, if needed or desired, for an entire flight plan, both before or during flight.

It was noted above that the navigation databases 108 (as well as various other data sources) may, in some embodiments, be updated periodically, in response to a NOTAM (notice to airmen) or datalink message, or in response to user input. It may thus be appreciated that each of the coverages, switchover distances (times), uncontrolled airspace sections, etc. described above are, in at least a particular preferred embodiment, periodically updated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying air traffic control communication information in an aircraft having an aircraft communications radio, the method comprising:
   processing data to determine one or more aircraft positions;
   processing data to identify each air traffic control (ATC) communication station that is within a predetermined distance of the one or more aircraft positions;
   processing data to determine which of the identified ATC communication stations are, or will be, within range of the aircraft communications radio;
   rendering, on a display device, indicia representative of the identified ATC communication stations determined to be within the range of the aircraft communications radio; and
   rendering a communication range graphic on the display device, the communication range graphic representative of the range of the aircraft communications radio.

2. The method of claim 1, further comprising:
   processing data to determine which of the identified ATC communication stations are active ATC communication stations and which are inactive ATC communication stations, wherein:
      an active ATC communication station is one (i) that is or will be within the range of the aircraft communications radio and (ii) with which the aircraft communications radio may actively communicate, and
      an inactive ATC communication station is one with which the aircraft communications radio may not communicate.

3. The method of claim 2, further comprising:
   rendering on the display indicia representative of each active ATC communication station in accordance with a first display paradigm; and
   rendering on the display indicia representative of each inactive ATC communication station in accordance with a second display paradigm.

4. The method of claim 3, further comprising:
   tuning the aircraft communications radio to one of the active ATC communication stations.

5. The method of claim 4, further comprising:
   rendering a movable cursor on the display device, the movable cursor responsive to a user interface to move over and select the indicia representative of an active ATC communication station; and
   tuning the aircraft communications radio to the active ATC communication station that is represented by the indicia selected using the movable cursor.

6. The method of claim 2, further comprising:
   processing flight plan data to determine a current flight plan of the aircraft;
   tuning the aircraft communications radio to one of the active ATC communication stations;
   determining a switchover distance, the switchover distance being a distance from the current aircraft position to an aircraft position at which a next one of the identified ATC communication stations on the current flight plan will become an active ATC communication station; and
   rendering, on the display device, at least the switchover distance.

7. The method of claim 6, further comprising:
   rendering, on the display device, at least a portion of the current flight plan, the active ATC communication station, and the next one of the identified ATC communication stations.

8. The method of claim 2, further comprising:
   processing flight plan data to determine a current flight plan of the aircraft;
   tuning the aircraft communications radio to one of the active ATC communication stations;
   determining a switchover time, the switchover time being a time it takes to get from the current aircraft position to an aircraft position at which a next one of the identified ATC communication stations on the current flight plan will become an active ATC communication station; and
   rendering, on the display device, at least the switchover time.

9. The method of claim 8, further comprising:
   rendering, on the display device, at least the current flight plan, the active ATC communication station, and the next one of the identified ATC communication stations.

10. The method of claim 2, further comprising:
    processing flight plan data to determine a current flight plan of the aircraft, the current flight plan including a plurality of legs on which the aircraft will fly;
    determining if the current flight plan includes one or more uncontrolled airspace sections, an uncontrolled airspace section being at least a portion of one or more of the plurality of legs of the current flight plan that, when flown by the aircraft, will include no active ATC communication stations; and
    rendering, on the display device, the one or more uncontrolled airspace sections.

11. The method of claim 10, wherein those portions of the current flight plan that are not uncontrolled airspace sections are controlled airspace sections, and wherein the method further comprises:
    rendering, on the display device, the controlled airspace sections in accordance with a first display paradigm; and
    rendering, on the display device, the uncontrolled airspace sections in accordance with a second display paradigm.

12. The method of claim 11, further comprising:
    determining a distance to void, the distance to void being a distance from the current aircraft position to an uncontrolled airspace section; and
    rendering, on the display device, the distance to void.

13. The method of claim 12, further comprising:
    determining if an alternate flight plan for the aircraft will eliminate one or more uncontrolled airspace sections and, if so, rendering the alternate flight plan on the display.

14. The method of claim 1, wherein the indicia includes graphical information and textual information.

15. The method of claim 1, wherein the communication range graphic is rendered as a user interactive field within which a user to may enter a value for the range of the aircraft communications radio.

16. A method of displaying air traffic control communication information in an aircraft having an aircraft communications radio, the method comprising:
    processing flight plan data to determine a current flight plan of the aircraft, the current flight plan including a plurality of legs;
    processing data to identify air traffic control (ATC) communication stations that will be within a predetermined distance of each of the plurality of legs;

processing data to determine which of the identified ATC communication stations are active ATC communication stations and which are inactive ATC communication stations;

determining if the current flight plan includes one or more uncontrolled airspace sections, an uncontrolled airspace section being at least a portion of one of more of the plurality of legs of the current flight plan that, when flown projected to be flown by the aircraft, will include no active ATC communication stations;

determining a distance to void, the distance to void being a distance from an aircraft position to an uncontrolled airspace section;

rendering, on the display device, the distance to void;

rendering, on the display device, those portions of the current flight plan that are not uncontrolled sections in accordance with a first display paradigm; and rendering, on the display device, the one or more uncontrolled airspace sections in accordance with a second display paradigm, wherein:
   an active ATC communication station is one (i) within the predetermined distance of one of the plurality of legs and (ii) with which the aircraft communications radio may actively communicate, and
   an inactive ATC communication station is one with which the aircraft communications radio may not communicate.

17. The method of claim 16, further comprising:
determining if an alternate flight plan for the aircraft will eliminate one or more uncontrolled airspace sections and, if so, rendering the alternate flight plan on the display.

18. A method of displaying air traffic control communication information in an aircraft having an aircraft communications radio, the method comprising:

processing flight plan data to determine a current flight plan of the aircraft;

processing data to determine one or more aircraft positions;

processing data to identify each air traffic control (ATC) communication station that is within a predetermined distance of the one or more aircraft positions;

processing data to determine which of the identified ATC communication stations are, or will be, within range of the aircraft communications radio;

processing data to determine which of the identified ATC communication stations are active ATC communication stations and which are inactive ATC communication stations, tuning the aircraft communications radio to one of the active ATC communication stations;

determining a switchover time, the switchover time being a time it takes to get from the current aircraft position to an aircraft position at which a next one of the identified ATC communication stations on the current flight plan will become an active ATC communication station;

rendering, on a display device, indicia representative of the identified ATC communication stations determined to be within the range of the aircraft communications radio; and rendering, on the display device, at least the switchover time, wherein:
   an active ATC communication station is one (i) that is or will be within the range of the aircraft communications radio and (ii) with which the aircraft communications radio may actively communicate, and
   an inactive ATC communication station is one with which the aircraft communications radio may not communicate.

* * * * *